United States Patent [19]

Pollack et al.

[11] Patent Number: 4,760,257

[45] Date of Patent: Jul. 26, 1988

[54] APPARATUS FOR MEASURING PROPERTIES OF A LASER EMISSION

[75] Inventors: Slava A. Pollack, Palos Verdes Estates; I-Fu Shih, Seal Beach; Robert Tzeng, Lomita, all of Calif.

[73] Assignee: Hughes Aircraft Company, Los Angeles, Calif.

[21] Appl. No.: 899,277

[22] Filed: Aug. 22, 1986

[51] Int. Cl.⁴ .................... G01N 21/84; G01N 21/00
[52] U.S. Cl. ............................. 250/330; 250/332; 250/370.01; 356/73.1
[58] Field of Search ............... 250/330, 332, 333, 334, 250/370 I, 370 G, 338 SE; 356/73.1, 121

[56] References Cited

U.S. PATENT DOCUMENTS 4,320,462  3/1982  Lund et al. ..................... 364/525

FOREIGN PATENT DOCUMENTS 0156528  9/1982  Japan .............................. 250/330
0082831  5/1985  Japan ............................. 356/73.1

OTHER PUBLICATIONS

P. P. Feofilov and V. V. Ovsyankin, "Cooperative Luminescence of Solids", Applied Optics, vol. 6, No. 11 (Nov. 1967), pp. 1828–1833, [Bound Volume in CP04–08D33, S.P.E., John K. Corbin].

Primary Examiner—Janice A. Howell
Assistant Examiner—Constantine Hannaher
Attorney, Agent, or Firm—Leonard A. Alkov; A. W. Karambelas

[57] ABSTRACT

Apparatus is provided for measuring the numerical apertures of an optical fiber in the infrared region. The optical fiber is appropriately mounted in accordance with conventional testing standards. Infrared energy is transmitted through the optical fiber. At a predetermined distance from the end of the optical fiber, a conversion screen can be provided for transforming the emitted infrared energy into a lesser wavelength of energy. The energy distribution can be recorded with a detector compatible with the lesser wavelength energy whereby the numerical aperture can be computed from the recorded data.

18 Claims, 2 Drawing Sheets

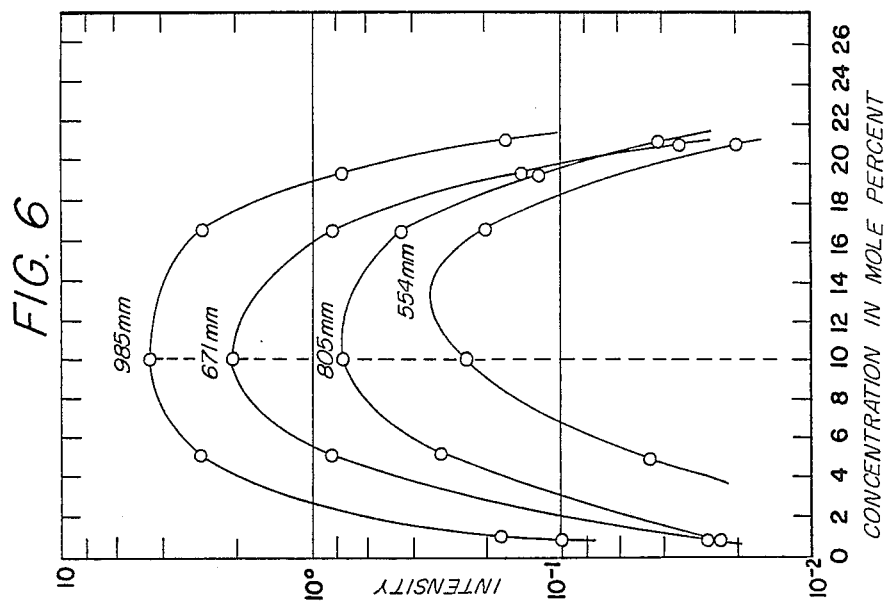
FIG. 6
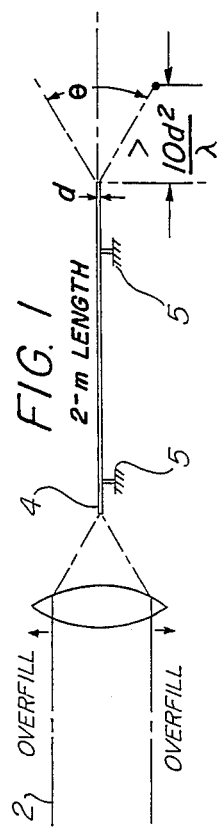
FIG. 1
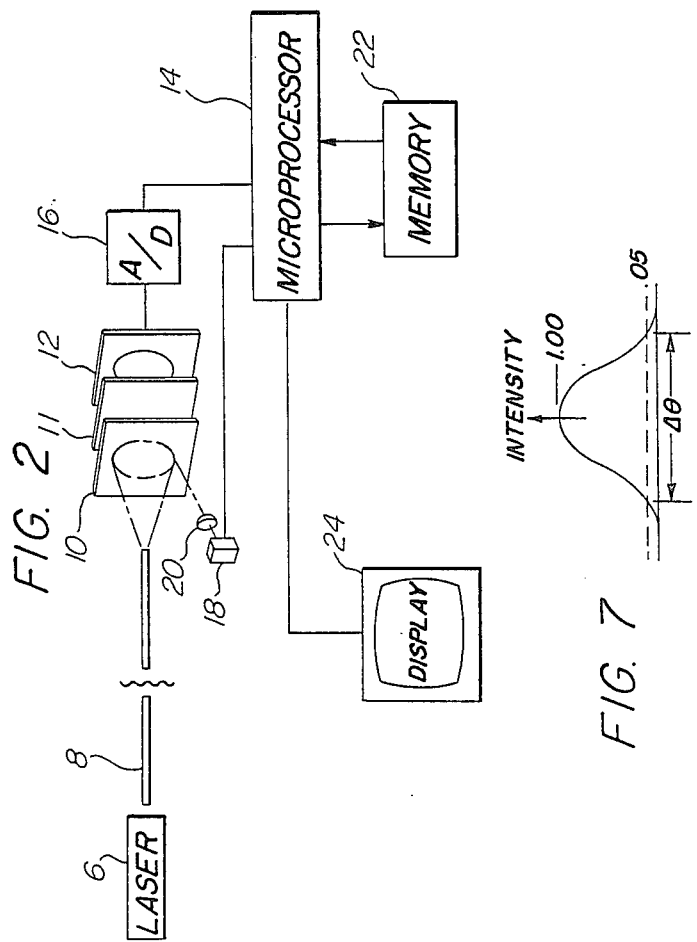
FIG. 2
FIG. 7

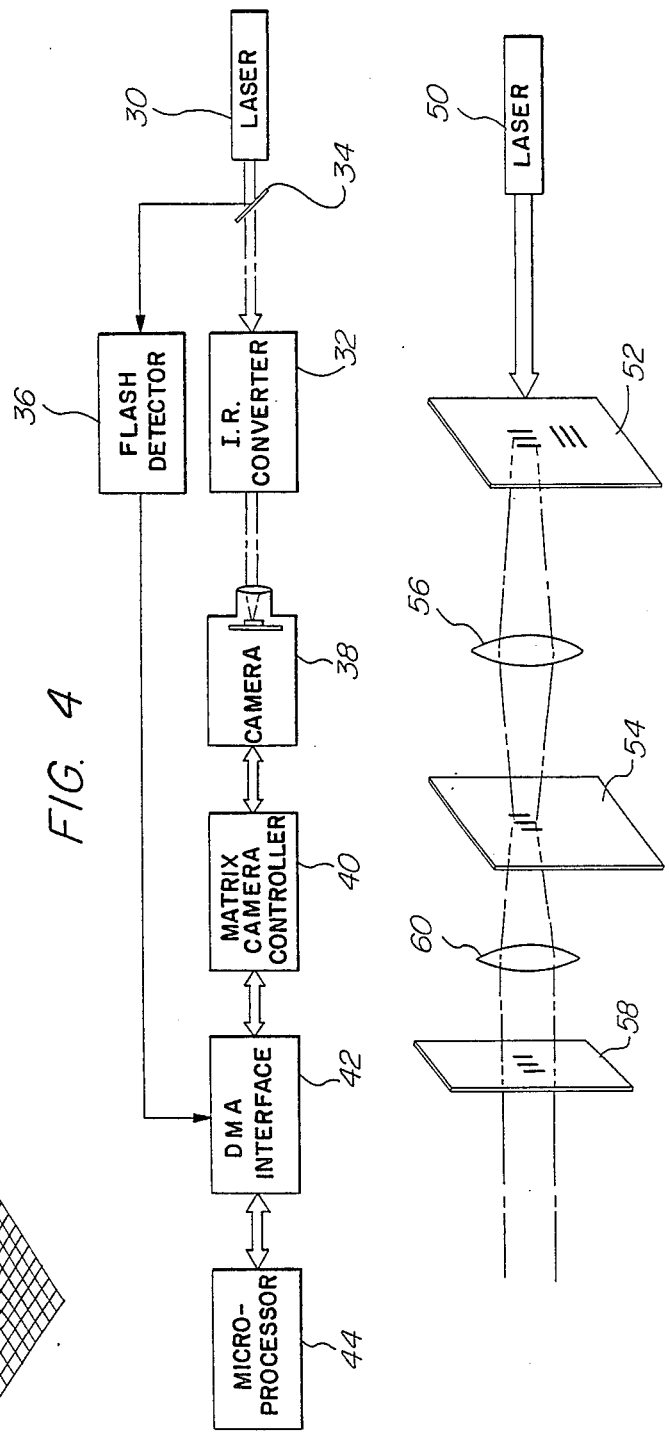

APPARATUS FOR MEASURING PROPERTIES OF A LASER EMISSION

BACKGROUND OF THE INVENTION

1. Field of the Invention

The present invention is directed to an apparatus for measuring the properties of an emitted laser beam, and more particularly to an apparatus for determining the characteristics of an optical fiber in the laser infrared wavelength range.

2. Description of the Prior Art

Fiber optics have become an important electro optical component in numerous information and communication systems. The ability of a specific optical fiber to carry energy is an important design consideration. The current trend in the optical fiber communication field is to develop optical fibers and optical components for the so-called second and third fiber transmission windows at 1.3 and 1.6 microns, respectively. It has been discovered that these transmission windows are characterized by low optical fiber energy losses due to reduced Rayleigh scattering which exhibits $\lambda^{-4}$ wavelength dependence. The increased recognition of the advantages of this technology has created a requirement to measure and quantify the characteristics of these optical fibers. One of the conventional forms of a measurement standard is the numerical aperture which is the sine of the half angle of the widest bundle of energy transmission. This measurement of an optical fiber determines the light gathering ability of the fiber, that is, it defines the half angle $\theta/2$ of the light acceptance cone. Light waves injected at angles within this cone will be waveguided, while rays entering the fiber core at steeper angles will be lost. The numerical aperture, NA, is related to the acceptance cone angle by the following relation:

$$NA = n \: SIN \: \theta/2 = \sqrt{n_1^2 - n_2^2}$$

wherein n is the index refraction of the interfacing medium, such as air, $n_1$ and $n_2$ are the refractive indices of the core and cladding materials respectively of the optical fiber. Thus, a measurement of the numerical aperture is an important parameter in determining the coupling efficiency of an optical fiber to a source, such as an LED or laser. It is also important in calculating the injection losses when dissimilar fibers are connected and in determining the susceptibility of a fiber to microbending.

The standard procedure for measuring the optical fiber numerical aperture usually follows the guidelines issued by the National Bureau of Standards in cooperation with the Electronic Industries Association and calls for measuring the accuracy to within two percent. The traditional techniques for measuring the numerical aperture of optical fibers comprise an expensive and complicated interferometric technique, which measures the optical fiber refractive index profile from which the numerical aperture can be calculated, or alternatively, a relative simple technique which measures the far field pattern of radiation emerging from the optical fiber. Both of these techniques, however, use visible light and consequently the experimental values of the numerical aperture obtained can be as much as ten percent different from the true values of the numerical aperture experienced for the transmission of infrared wavelengths.

Utilizing conventional equipment has proved difficult in measuring infrared transmission in optical fibers. Conventional infrared sources are injection laser diodes and incandescent sources which can be expensive, and in the case of laser diodes emit low power, while in the case of the incandescent sources can be cumbersome. There are no practical LED's that emit in the infrared region and there is a farther problem in imaging the infrared radiation, since silicon diode matrix arrays are relatively insensitive to radiation wavelengths longer than one micron, and pyroelectric detector matrix arrays are very expensive and suffer from inadequate resolution.

Thus, there is a demand in the prior art to provide a relatively inexpensive, high resolution apparatus for measuring the numerical aperture of infrared radiation transmission in optical fibers.

Additionally, there is a demand to provide an improvement in the measurement of the total energy, relative position and divergence of an infrared laser beam over the prior art disclosed in U.S. Pat. No. 4,320,462.

SUMMARY OF THE INVENTION

The present invention is directed to an apparatus for measuring the properties of infrared transmissions from an optical fiber, such as a numerical aperture. The present invention is also useful in measuring other properties of infrared transmission and for viewing and recording infrared images.

In a preferred embodiment of the present invention, fixtures are provided for mounting the optical fiber in accordance with industrial standards and infrared energy can either be excited within the optical fiber or from an external source which is transmitted through the optical fiber for emission at one end. An up-conversion screen of a crystalline material appropriately doped with a rare earth ion can be used for converting the emitted infrared energy into a lesser wavelength, such as within the visual spectrum, which can then be appropriately recorded or processed to compile data on the infrared laser transmission. For example, a calcium fluoride crystal can be doped with erbius ions and a computer based image recording system using, for example, a silicon diode matrix array, can detect the visual spectrum that corresponds to the infrared transmission. Digital signals can be derived from the diode matrix array and then subsequently processed to remove noise and to determine the far field pattern for deriving a numerical aperture. Likewise, the total energy, relative position and divergence of the infrared laser beam can be appropriately recorded in a relatively inexpensive high resolution system.

The features of the present invention which are novel are set forth with particularity in the appended claims. The present invention both as to its organization and matter of operation, together with further objects and advantages thereof, may be best understood by reference to the following, taken in conjunction with the accompanying drawings.

BRIEF DESCRIPTION OF THE DRAWINGS

FIG. 1 is a schematic of a general layout for determining a fiber optic numerical aperture;

FIG. 2 is a schematic layout of a system for determining the numerical aperture;

FIG. 3 is a three-dimensional graphic display of an actual measurement from an array sensor of the present invention;

FIG. 4 is an alternative embodiment for realizing an image of infrared radiation;

FIG. 5 is another alternative embodiment for realizing an image of infrared radiation;

FIG. 6 is a graph disclosing the intensity of the strongest radiation bands plotted as a function of the erbium ion concentration for a constant sample irradiance; and FIG. 7 is an energy distribution graph of the emitted radiation from the fiber optics.

DESCRIPTION OF THE PREFERRED EMBODIMENTS

The following description is provided to enable any person skilled in the electro-optical field to make and use the present invention and sets forth the best modes contemplated by the inventors for carrying out their invention. Various modifications, however, will remain readily apparent to those skilled in the art, since the generic principles of the invention have been defined herein specifically to provide a novel and relatively inexpensive apparatus for converting infrared energy to a lesser wavelength and measuring the characteristics of a laser beam and the optical fiber carrying infrared energy.

A primary object of the present invention is to provide a relatively inexpensive conversion of infrared energy, for example, in the wavelength of 1540 nm to a shorter wavelength that is more adaptable for detection by detecting arrays. The present inventors have conducted experimental measurements of the intensity dependency and temporal behavior of up-converted or visible conversion radiation that have permitted a qualitative agreement with a simple model of a cooperative luminescence process. The present invention has been found to satisfy requirements of adequate efficiency, sensitivity, dynamic range, resolution, speed of response, and linearity necessary for both the commercialization and reproduceability of test results.

Briefly, the present invention relies upon excitation of conversion material such as alkaline earth halides wherein absorption occurs in different atoms with subsequent migration of energy by means of a cooperative mechanism, resulting in an accumulation of excitation energy in one atom. The ground-state electrons of several atoms absorb one infrared photon each, and that energy subsequently migrates through a non-radiative process to a single atom, exciting it into a higher energy level with ensuing fluorescence. Because of the anti-Stokes nature of the up-conversion process, the wavelength of the output light will be shorter than that of the input radiation. For further explanation of this phenomena, reference can be made to an article in "Applied Optics", Volume 6, page 1828, by P. Feofillov et al., 1967, and an article in the "Optical Spectroscope", Volume 28, page 112, by V. Ovayankin (1970).

The present invention relies upon the use of an ionized rare alkaline earth halide impurity in various host materials, such as $Er^{3+}$ embedded in a calcium fluoride crystal to provide an efficient conversion of infrared radiation in the wavelength range of 900 to 1600 nm. The present invention utilizes the up-conversion process in mixed crystals of erbium ions incorporated into a matrix of calcium fluoride, $CaF_2$, for purposes of providing a conversion screen that could be conveniently utilized with a relatively inexpensive silicon PIN photodiode matrix array. The parameters of the design efforts were to address efficiency, linearity, saturation, response time, and spatial resolution, among other factors in developing the present invention.

During the work on the present invention, an up-converted spectrum of calcium fluoride doped with erbium ions was exited by 1540 nm of laser radiation at about 100 watts of peak power with long pulses lasting for about one millisecond. The resulting converted radiation consisted of several 20 to 50 nm wide bands of energy extending between 380 nm and 2,700 nm. The strongest band of radiation, listed in order of decreasing intensity, had peaks at approximately 980, 670, 805, and 550 nm, as can be seen from FIG. 6. FIG. 6 discloses the intensity of the strongest bands plotted as functions of the erbium ion concentration for constant sample irradiance. It was found that the most efficient up-conversion occured in samples containing about 10 mole percent of erbium ions.

As a result of the test, the 980 nm band was found to be the most suitable for the purposes of the invention because this band was excited by a two-photon process, was strongest in the up-converted spectrum, and its wavelength coincided with the maximum responsivity of silicon PIN photodiodes. It was also found that saturation started around 1 watt per $cm_2$. As will be described later, neutral density filters can be utilized to control the saturation level.

Thus, in the preferred embodiment, utilizing calcium fluoride as the host material, imaging screens were assembled and the optimum erbium ion concentration was found to be around 10 mole percent. To insure response linearity at the imaging screen in the wavelength of 900 nm, a minimum laser beam irradiance at the screen of one watt/$cm^2$ was required.

The up-conversion screens of the present invention were formed by two separate techniques. The first technique used a single crystal glued to a glass substrate which was subsequently ground and polished to a thickness of less than 300 microns. The second technique ground the up-conversion material of $CaF_2$ to a fine powder and mixed it with an epoxy binder such as conventional optical cement, transparent to 1540 nm radiation and then deposited it as a thin 100 to 300 microns emulsion on a glass substrate.

The first technique resulted in screen of 1 to 2 cm in diameter while the second technique allowed making large screens of relatively unlimited size. It was found that the spatial resolution of the screen was limited by the quality (granularity) and thickness of the emulsion and the uniformity of the illumination, rather than by the cooperative luminescence process of the up-converting material.

Referring to FIG. 1, a schematic diagram discloses an arrangement from which information regarding a numerical aperture can be derived. A laser source (not shown) is positioned to generate a laser beam 2 for reception by one end of a fiber optic element 4. Usually, the fiber optic element will be 2 m in length and appropriately mounted in fixtures 5. As can be seen, the fiber optic element provides a flat end which is perpendicular to the optical axis of the fiber optical element and which emits laser radiation over a cone angle $\theta$. Measurement is made at a distance somewhat greater than $10d^2/\lambda$ where d is the diameter of the fiber optic, and $\lambda$ is the emitting wavelength of radiation.

FIG. 7 is a cross-sectional view of the radiation distribution with a far field angle determined at five percent (5%) of the maximum intensity. As can be seen from the interface of the laser beam 2 with the fiber optic 4, any emission of radiation beyond the accepting cone angle of the fiber optic will be an overfill and will not be useful for the system.

The techniques of measuring the far field angle to derive the numerical aperture for a particular fiber optic are known for the visual spectrum. The present invention addresses the inaccuracies that have occurred in attempting to interpolate measurements using a visible wavelength to determine the actual efficiency through a numerical aperture value in the infrared energy range.

Referring to FIG. 2, a schematic diagram of one embodiment of the present invention is disclosed. A laser source 6 capable of emitting 1540 nm of radiation is utilized. In this regard, the present inventors have used an erbium glass laser emitting about 100 watts of peak power with the pulses lasting for about 1 msec. Alternatively, a Raman shifted neodymium doped glass or yttrium-aluminum-garnet laser system could convert 1060 nm radiation to 1540 nm using a high pressure methane gas as the Raman shifter. The particular laser source of infrared radiation and the desired wavelength should not limit applications of the present invention. The fiber optic element 8 under test transmits the infrared radiation and it, in turn, is aimed at an up-conversion screen 10 consisting of a calcium fluoride doped crystal structure with 10% erbium ions, $Er^{3+}$.

Behind the up-conversion screen 10 is a silicon photodiode matrix array 12 that can, for example, be part of an EG&G Reticon model MC520 camera that mounts a 100×100 silicon photodiode matrix array and associated conventional electronics (not shown) to control scanning of the array. It is possible to attenuate the input beam with the aid of a neutral density filter 11 or an aperture diaphragm (not shown) to an acceptable level to prevent any saturation of the photodiode matrix array. The power of the laser beam, as mentioned before, should be in excess of 1 watt/$cm^2$ in order to assure linearity of response of the up-converting screen 10. A microprocessor base control unit 14 which, for example, can include a camera control unit, such as EG&G Reticon model No. RS510, an interface circuit and a microprocessor with an appropriate algorithm can provide the necessary timing information to the scan control unit to read the data and receive the video signal from the photodiode matrix array 12 and subsequently to process the information. An analog digital converter circuit 16 can initially convert the video signals from each array element to a digital format and then send them to the microprocessor 14 through an appropriate computer interface unit (not shown). The computer interface unit can, for example, consist of XY counters and even-odd character registers. An infrared sensitive detector in the beam path of the infrared emission from the fiberoptic or alternatively, a visible wavelength photodetector 18, can monitor the light from the conversion screen 10 as it is focused by a lens 20. The photodetector 18 can provide timing information to the interface unit to indicate when energy is received and stored by the photo array 12. A computer RAM memory 22 or the like can provide storage for the digital data received from the analog to digital converter 16. The microprocessor 14 can be coupled directly to the detector array for controlling the element scanning thereof or to a camera control unit depending on the particular approach selected and is additionally coupled to the computer memory 22 for processing the data stored therein. The microprocessor 14 can be further connected to a display 24 to provide the derived values automatically to the user.

The interface unit can have two functional modes, pulsed and CW. Since the pulsed laser was used as the radiation source, the image data can be processed according to a system which can be described by the following sequence of events. Upon receiving the I/O line and PTCL signals from a Hewlett Packard Model HP9845 computer, the XY counters can be started to count the scan address (from 1 to 10,000) and, in the absence of the laser pulse, the procedure will be repeated approximately every 40 msec. When the laser pulse occurs, the sensor 20 of the interface unit can activate a flip-flop which can in turn stop the XY counters, thus fixing the address of the first byte of the image data. This information can be transmitted to the computer memory 22 for future use. Simultaneously, the even/odd character registers began to store the image data (8 bit/character), received from camera RS520 terminals, and converted them into 16 bit (2 pixels) data words. At the completion of this process, the interface unit can send the data ready signal (PFLG) to the computer 14 and the computer can begin storing the 16 bit image and dark current data into the RAM memory via the direct memory access channel. The RAM address count can be set at 10,000, i.e., 20,000 bytes equally divided between the image and dark current data. After completing the data storing, the computer 14 is programmed to subtract the dark current from the image data, to analyze the XY address of the first image byte provided by the interface unit, and to reconstruct and process the information to derive the numerical aperture pursuant to the known equation. At this point, the interface unit settles into an "idle state" and is ready to receive the next I/O and PTCL signals from the computer 14.

Referring to FIG. 4, an alternative embodiment of the present invention is disclosed that is a minor modification from the embodiment of FIG. 2. With regard to both of these embodiments the disclosure material of U.S. Pat. No. 4,320,462 is incorporated herein by reference to provide supplemental background information which is not essential but is helpful in appreciating the applications of the present invention.

In the embodiment of FIG. 4, an infrared laser source 30 emits an laser beam towards an IR converter 32, such as the up-converting screen of the present invention. A portion of the laser beam is directed by a semitransparent reflector member 34 to an appropriate flash detector 36. A photodiode array is mounted to receive the visible radiation from the IR converter 32. The photodiode array can be part of a camera 38, such as an E&G Reticon Model MC520 Camera. Appropriate filters and optical lenses for focusing and directing the radiation can be utilized but are not shown in FIG. 4 for purposes of simplicity. A matrix camera controller 40, such an an EG&G Reticon Model RS520 can control the scanning of the photodiode array and provide a video signal. The timing is further helped by a DMA interface circuit 42 which in turn can be controlled by a microprocessor 44, such as the Hewlett Packard Model HP9845 Computer.

As can be appreciated, the schematic circuitry is for purposes of illustration and conventional circuitry components would complement the actual circuit arrangement. As can be appreciated, conventional signal processing techniques can be utilized to eliminate or minimize any background noise level measured by the detector array, for example, by providing a preliminary scan storing the data and then using the stored data as a reference during an actual measurement of the conversion of the infrared laser pulse into visible energy.

Referring to FIG. 4, once a laser pulse is detected by the flash detector 36 the DMA interface enables the camera controller 40 to control the scan of the camera 38 to provide a video signal of the visible image pattern. In the embodiment of FIG. 4 it is possible to calculate the values of the total energy, relative position and divergence of the infrared laser beam. Calculations can be determined as follows:

The total energy (P$_T$) may be calculated from the equation $$P_T = \sum_{i=1}^{n} P_i,$$

wherein P$_i$ is the energy in any particular detector element and the summation is over all detector elements, with n=1024 being a representative number of detector elements in the detector array.

The boresight, or relative position calculation may be made by computing energy moments about a set of orthogonal axes to determine the center, or centroid, of the laser beam. This calculation is analogous to calculations performed to determine the center of mass or gravity of an object. For example, the location of the center of mass of a two-dimensional object may be determined from the equation:

$$c.m. = \bar{x}, \bar{y} = \frac{\sum_i x_i m_i}{\sum_i m_i}, \frac{\sum_i y_i m_i}{\sum_i m_i},$$

where $\bar{x}$ and $\bar{y}$ are the x and y coordinates of the center of mass, and x$_i$ and y$_i$ are the lengths of moment arms to any particular infinitesimal mass element, m$_i$, measured from a particular set of reference axes. This computation is well-known to those in physics or engineering disciplines. The calculated boresight may be compared with the known center of the detector array and the laser beam may be adjusted to have its center located at that position, if desired.

The divergence calculation computes the diameter of the laser beam in which 90% of the energy is contained. The ideal beam profile of the laser beam is Gaussian in shape with the power level tapering off exponentially near the outer edges of the beam as can be seen in FIG. 7. Measurement of the beam diameter containing 90% of the total energy provides a measurement standard for comparing laser beam profiles. The divergence may also be represented as an angular deviation of the laser beam (in milliradians) being collimated. This is also termed "spreading" of the laser beam. The angular deviation is given by the ratio of the beam diameter to the distance between the laser source and the detector array im milliradians.

The divergence may be determined using the detector element of the previously determined beam center as a starting point and summing the stored signals associated with the elements of the detector array in a predetermined manner. The microprocessor 44 sums the sets of detector elements which approximate circles of varying diameter until the 90% energy value is reached. Once the 90% energy value is reached, the corresponding beam diameter can be provided to a display.

FIG. 5 represents a test procedure to determine the resolution of the up-converting screen of the present invention. In this regard, an IR laser 50 was directed at the vertical lines of an United States Air Force resolution target 52. The vertical lines were isolated from the rest of the target by placing an aperture (not shown) over it. The spatial frequency for this group of vertical lines is given as 8 line-pairs/mm, which makes the separation between two lines to be 125 μm. The 1:1 image on the up-converting screen 54 was focused by a lens 56. The photodiode array 58 had a diode separate in the array of 60 μm which permitted a resolution of 120 μm. As can be seen, the spatial frequency of the vertical lines was close to the resolution limit of the photodiode array DMA. In order to obtain undistorted information about the resolution capability of the up-converting screen 54, the image projected onto the diode matrix array 58 was optically magnified by a factor of 2 through the lens 60. The recorded lines were fully resolved and the upper resolution limit of the up-converting screen 54 of the present invention as demonstrated by this test was at least 125 μm. It was determined that the spatial resolution of the up-converting screen would be primarily limited by its thickness rather than the cooperative luminous process. As can be appreciated, the present invention can also work with the detector array focused at an angle to the impact surface of the screen rather than behind the screen.

The present invention has described an apparatus to provide fast and efficient measurement for certain laser beam parameters, including total energy, divergence and mean position in the infrared range. Additionally, the present invention discloses apparatus for automatically determining the numerical aperture for a fiberoptic in the infrared range.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention.

What is claimed is:

1. Apparatus for measuring the numerical aperture of an optical fiber in the infrared region comprising:
   means for mounting the optical fiber;
   means for transmitting infrared energy through the optical fiber for emission at one end;
   means for converting the emitted infrared energy into a lesser wavelength of energy at a predetermined distance from the end of the optical fiber including a screen member having an active converting material with about 10 mole percent erbium ion concentration and a thickness of approximately 300 microns; and
   means for recording the energy distribution of the lesser wavelength such that the numerical aperture can be computed from such recorded data.

2. The invention of claim 1 wherein the means for recording includes a detector array for detecting the lesser wavelength received from the means for converting and means for providing digitized signals representative of the field angle of the lesser wavelength energy pattern, and means for automatically processing the digitized signals to provide a determination of a numerical aperture for a predetermined power of the optical fiber.

3. The invention of claim 1 wherein the means for converting includes a predetermined thickness of a rare earth doped crystal material, the crystal material being doped sufficiently to provide a cooperative excitation when subject to a sufficient intensity between 900 and 1600 nanometers.

4. The invention of claim 3 wherein the crystal material is doped with erbium ions.

5. The invention of claim 4 wherein the crystal material is calcium fluoride.

6. The invention of claim 1 wherein the means for converting includes a conversion screen of an alkaline earth halide material capable of emitting a lesser wavelength of energy than the impacting infrared energy and a neutral density filter, the filter being positioned before the means for recording to prevent saturation.

7. The invention of claim 6 wherein the means for recording is a detector array.

8. The invention of claim 1 further including means for automatically determining the numerical aperture of the optical fiber from the recorded data.

9. An improved laser system analyzer for determining from an infrared laser pulse, the total energy, relative position and divergence of an infrared laser beam made incident thereupon, said apparatus comprising:
   a conversion member having an active converting material with about 10 mole percent erbium ion concentration and a thickness of approximately 300 microns for converting the infrared laser pulse into visible energy;
   an array of detector elements for detecting the visible energy received from the conversion member and providing electrical signals indicative of the visible energy;
   means coupled to said detector array for digitizing the signals provided; and
   computer means including a memory, for scanning said detector array in a predetermined manner and storing digitized signals received thereby and for processing said digitized signals so as to provide values of the total energy, relative position and divergence of said laser beam.

10. The invention of claim 9 wherein the conversion member includes a predetermined thickness of a rare earth doped crystal material, the crystal material being doped sufficiently to provide a cooperative excitation when subject to a sufficient intensity between 900 and 1600 nanometers.

11. Apparatus for measuring the numerical aperture of an optical fiber in the infrared region comprising:
    means for mounting the optical fiber;
    means for transmitting infrared energy through the optical fiber for emission at one end;
    means for converting the emitted infrared energy at a predetermined distance from the end of the optical fiber to a lesser wavelength of energy including a screen of a rare earth doped crystal material, the crystal material being doped sufficiently to provide a cooperative excitation when subject to a sufficient intensity in the spectral regions around 900 nanometers and also around 1600 nanometers and having a thickness of approximately 300 microns or less;
    an array of detector elements for detecting the lesser wavelength energy received from the conversion member and providing electrical signals indicative of the lesser wavelength energy intensity;
    means coupled to said detector array for digitizing the signals provided thereby; and
    computer means including a memory, for scanning said detector array in a predetermined manner and storing digitized signals received and for processing said digitized signals so as to provide the numerical aperture.

12. The invention of claim 11 wherein the screen consists of a mixture of calcium fluoride particles embedded in an optically transparent binder.

13. The invention of claim 11 wherein the means for transmitting further including means for irradiating the screen with energy of a minimum of one watt/cm$^2$.

14. The invention of claim 13 further including a neutral density filter, the filter being positioned before the detector elements to prevent saturation.

15. The invention of claim 11 wherein the crystal material is doped with erbium ions.

16. The invention of claim 15 wherein the crystal material is calcium fluoride.

17. Apparatus for measuring the numerical aperture of an optical fiber in the infrared region comprising:
    means for mounting the optical fiber;
    means for transmitting infrared energy of at least one watt/cm$^2$ through the optical fiber for emission at one end;
    means for converting the emitted infrared energy into a lesser wavelength of energy at a predetermined distance from the end of the optical fiber including a screen consisting of a mixture of calcium fluoride particles, doped with erbium ions, embedded in an optically transparent binder; and
    means for recording the energy distribution of the lesser wavelength such that the numerical aperture can be computed from such recorded data.

18. The invention of claim 17 wherein the screen has a thickness between 100 to 300 microns and the means for recording includes a detector array for detecting the lesser wavelength received from the means for converting and means for providing digitized signals representative of the field angle of the lesser wavelength energy pattern, means for automatically processing the digitized signals to provide a determination of a numerical aperture for a predetermined power of the optical fiber.

* * * * *